No. 711,178. Patented Oct. 14, 1902.
F. H. RICHARDS.
PLAYING BALL.
(Application filed Aug. 4, 1902.)

(No Model.)

Witnesses:
J. E. Davidson
O. C. Stickney

Inventor:
F. H. Richards

UNITED STATES PATENT OFFICE.

FRANCIS H. RICHARDS, OF HARTFORD, CONNECTICUT, ASSIGNOR TO THE KEMPSHALL MANUFACTURING COMPANY, A CORPORATION OF NEW JERSEY.

PLAYING-BALL.

SPECIFICATION forming part of Letters Patent No. 711,178, dated October 14, 1902.

Application filed August 4, 1902. Serial No. 118,227. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to playing-balls, especially those used in golf; and its object is to provide a ball of superior qualities. My improvements relate especially to the filling, which I so construct that the ball is rendered highly resilient in proportion to its size and weight.

Figure 1:
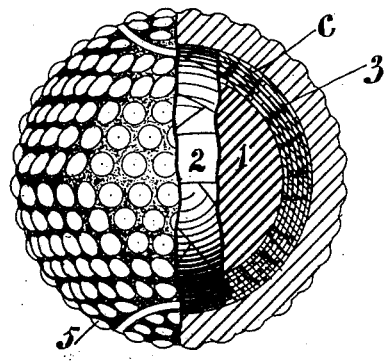
Figure 2:
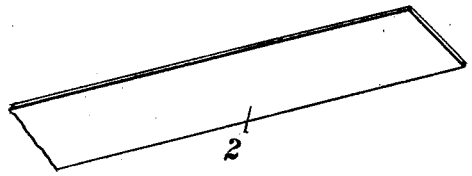
Figure 3:
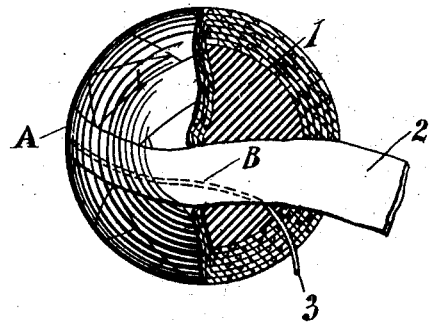

In the drawings forming part of this specification, Figure 1 is a part sectional view of one form of ball made in accordance with my present improvements. Fig. 2 shows a fragment of a rubber strip used in forming the filling. Fig. 3 is a part sectional view of the filling of the ball and is illustrative of the manner of winding the same.

In the several views similar parts are designated by similar characters of reference.

At the center of the ball is a sphere 1, which consists, preferably, of soft rubber and is preferably large in proportion to the size of the completed ball. Preferably said sphere 1 consists of a solid mass of molded rubber, although it may be otherwise constructed within the scope of my present improvements and may, if desired, have a center piece of hard material. Upon this sphere 1 I apply under great tension a sheet or strip 2, Fig. 2, which may consist of either sulfur-cured rubber or acid-cured dental dam, the latter being preferred principally because it is acid-cured and practically free from foreign mixture, which would impair its elasticity, and also because it can be drawn tight without liability to rupture and is not liable to become cut when wrapped upon wire. In practice I use with good results strips originally from one-half to three-fourths of an inch in width and from two one-hundredths to three one-hundredths of an inch in thickness, so that when tightly tensioned upon the ball the width is reduced to from one-fourth to one-half of an inch, as at A, Fig. 3, and its thinness in due proportion. A further advantage of the dental dam is its lightness, whereby the weight of other parts of the ball may be to some extent compensated. Simultaneously with winding the rubber strips I wind continuously in miscellaneous directions a length of thread, twine, strip, or cord 3. Each portion of the cord is wound upon the ball under great longitudinal tension, and hence holds the inclosed central portion of the ball under high compression. The structure hence comprises a sphere of soft rubber, which is bound tightly within windings of highly-tensioned sheet rubber and windings of fibrous material which is substantially unyielding in longitudinal direction, so that a ball of phenomenal energy is produced. Preferably the cord and rubber are wound on together, as illustrated at Fig. 3, so that the longitudinal axis of the cord substantially coincides with that of the windings of rubber; but this relative arrangement is not essential in all cases, so long as windings of rubber alternate with tense windings of fibrous material. As illustrated, the cord is wound within the rubber, as at B, Fig. 3; but this arrangement may be reversed and many variations in windings of cord and rubber may be resorted to. It will be seen that the cord 3 is independent of the rubber strip, and hence is distinguished from that elastic belting which consists of a sheathing of woven material, in which are inclosed strands of rubber. It will be seen that the convolutions of cord are of different diameters and wound in different directions and also that each of said convolutions is bound tightly by the conjoint action of the superposed highly-tensioned rubber and cord. The outer windings of cord and rubber hold all within in a powerful grip, and the rubber sphere 1 is in like manner gripped by all of the cord and rubber windings, so that the tendency upon the part of all of the members is to preserve a spherical form. When the ball is given a hard blow with a club, the cord convolutions directly affected by the club are flexed, while the ball as a whole is changed from its spherical form, this change being instantly resisted by the springy spherical core 1, which is confined under great tension by the windings of rubber and cord, so that the ball has a prodigious flying power. Upon the filling thus formed I provide a shell 5 of wear-resisting material, preferably gutta-percha, and preferably holding said filling under a high degree of compression. Since the windings of the cord and rubber are very effective in maintaining the spherical form of the filling, the shell, although in a tense condition thereon, is not subjected to undue additional strain by reason of the change of the filling from its normal spherical form under a blow, so that liability of the shell to burst under a heavy blow is minimized. It will also be understood that the layer which is formed of windings of rubber and cord and which is designated as C furnishes a local resiliency under the action of a blow and makes a very effective distribution of the force of the blow throughout a large portion of the ball.

A ball made in accordance with my present improvements may, if desired, contain a larger core 1 of solid soft rubber than heretofore found desirable in a high-class golf-ball, and hence less wound rubber may be employed in the layer C, thus maintaining or even increasing the efficiency of the ball while decreasing the expense of its production, since the solid molded rubber core 1 is less costly than the windings. However, my invention is not limited in all cases to the use of soft rubber for the inner part of the filling.

Having described my invention, I claim—

1. In a playing-ball, the combination with a core, of windings thereon of tensioned rubber alternating with tight windings of resilient and substantially non-extensible material independent of said rubber, and a cover upon said windings.

2. A playing-ball comprising a sphere and a cover thereon; said sphere consisting at least partially of windings of tensioned rubber mixed promiscuously with tight windings of substantially non-extensible material independent of said rubber.

3. A playing-ball comprising a sphere of soft rubber, windings thereon of tensioned rubber mixed with tight windings of cord independent of said rubber, and a cover.

4. A playing-ball comprising a sphere and a cover; said sphere comprising layers of soft rubber and tight windings of cord independent of said rubber.

5. A playing-ball comprising a rubber sphere, windings thereon of cord and tensioned rubber, said cord being independent of said rubber, and a cover.

6. A playing-ball comprising a core, windings thereon of tensioned rubber alternating with windings of cord independent of said rubber, and a cover.

7. A playing-ball comprising a sphere and a cover thereon, said sphere consisting at least partially of windings of rubber mixed with windings of cord independent of said rubber.

8. A playing-ball comprising a sphere of rubber, windings thereon of tensioned rubber mixed with windings of cord in a tense condition and independent of said rubber, and a hard cover formed of plastic material.

9. A playing-ball comprising a sphere of soft highly-elastic material throughout which are embedded convolutions of cord independent of said elastic material, and a cover of harder material.

10. A playing-ball comprising a sphere of soft rubber throughout which are embedded convolutions of cord in a tense condition and independent of said rubber, and a cover formed of plastic material and holding said sphere under compression.

11. A playing-ball at least a portion whereof consists of a length of cord and a strip of rubber wound coincidently, in miscellaneous directions, said cord being independent of said rubber.

12. A playing-ball at least a portion whereof consists of a length of cord and a strip of tensioned rubber wound coincidently, said cord being independent of said rubber.

13. A playing-ball at least a portion whereof consists of windings of cord in a tense condition interspersed with windings of tensioned approximately pure rubber strips, said cord and said strips being wound with substantial coincidence, one within the other, in miscellaneous directions, and said cord being independent of said rubber.

14. A playing-ball at least a portion whereof consists of windings of cord in a tense condition interspersed with windings of tensioned approximately pure rubber strips; said cord and said strips being wound with substantial coincidence, one within the other, in miscellaneous directions, said cord being independent of said rubber; and a rubber sphere within said windings.

15. A playing-ball at least a portion whereof consists of windings of cord in a tense condition interspersed with windings of tensioned approximately pure rubber strips; said cord and said strips being wound with substantial coincidence, one within the other, in miscellaneous directions, said cord being independent of said rubber; a rubber sphere within said windings; and a shell of gutta-percha holding said windings under compression.

16. A playing-ball at least a portion whereof consists of a thick spherical body of soft, elastic material, throughout which are interspersed convolutions of fibrous material, said convolutions beginning at the inner surface of said body and extending in miscellaneous directions and increasing in diameter to the outer surface of said body, and said fibrous material being independent of said elastic material.

17. A playing-ball at least a portion whereof consists of a thick spherical body of soft rubber, throughout which are interspersed windings of fibrous material which is independent of said rubber.

18. A playing-ball at least a portion whereof consists of a thick spherical body of tense soft rubber, throughout which are interspersed windings of cord in a tense condition, said cord being independent of said rubber; and said body being held under compression by a gutta-percha cover.

19. A playing-ball whereof at least a portion consists of windings of cord interspersed independently with windings of tensioned rubber strips.

20. A playing-ball having a hard shell and a core, and a layer between said shell and core; said layer consisting of cord mingling with rubber, and independent thereof.

FRANCIS H. RICHARDS.

Witnesses:
B. C. STICKNEY,
JOHN O. SEIFERT.